March 27, 1951 F. W. AVILA 2,546,712
SPRAG TYPE SYNCHRONIZER DEVICE
Filed Aug. 30, 1947 2 Sheets-Sheet 1

INVENTOR.
Frank W. Avila
BY Paul O. Pippel
Atty.

March 27, 1951  F. W. AVILA  2,546,712
SPRAG TYPE SYNCHRONIZER DEVICE
Filed Aug. 30, 1947  2 Sheets-Sheet 2

INVENTOR.
Frank W. Avila
BY Paul O. Pippel
Atty.

Patented Mar. 27, 1951

2,546,712

UNITED STATES PATENT OFFICE 2,546,712

SPRAG TYPE SYNCHRONIZER DEVICE

Frank W. Avila, Columbia City, Ind., assignor to International Harvester Company, a corporation of New Jersey Application August 30, 1947, Serial No. 771,434

7 Claims. (Cl. 192—53)

This invention relates to a drive coupling and is directed primarily to a synchronizer and drive coupling for use in automotive transmission.

Change-speed transmissions of the type currently used in automotive vehicles include mechanism for effecting speed changes between input and output shafts, and such mechanism conventionally utilizes means for synchronizing the speeds of such shafts before speed changes are effected. It is known that such mechanism is relatively complicated in construction and expensive to manufacture, inasmuch as such mechanism must operate through two phases, the first of which accomplishes synchronizing and the second of which achieves a final and positive drive connection. The difficulties attendant upon the achievement of speed changes in transmissions stem largely from the use of gears which are difficult to mesh while rotating at relatively high speeds; this difficulty is more pronounced when the gears to be meshed are rotating at different speeds. Various mechanisms have been resorted to for overcoming these difficulties, the most usual device combining a friction element and a positive gear element operating in sequence.

According to the present invention the complications of prior constructions are eliminated by the provision of a simple compound unit possessing all the desirable characteristics of a combined friction and positive coupling but eliminating the disadvantages thereof. To this end it is proposed to provide a coupling member comprising a segmented ring cooperable with a relatively rotatable coupling element wherein the action is such that the segments or components of the ring serve first to frictionally and subsequently to positively engage themselves between two coupling elements.

It is an important feature of the invention to provide a drive coupling that is simple and inexpensive to manufacture, inasmuch as the segmented ring is composed of a plurality of like components in the form of wedges arranged in a circle in such manner that each component or wedge may direct part of its force to a neighboring wedge for the purpose of establishing a complete annular engagement between a pair of coupling elements. The invention also provides for the use of such coupling in multiple so that the coupling may be shifted in either direction for use in two different speed ratios.

Other objects of the invention include: The provision of means for accommodating variations in the size of the wedges incident to manufacture; the provision of a coupling including means for retaining the wedges in circular association; the provision in such means of an arrangement permitting relative rotation between the compound or segmented ring and the coupling elements so that the engaging portions of the ring may engage the coupling elements at different points on the peripheries of the latter, whereby cold-working of the coupling components is eliminated.

The foregoing and other important objects and desirable features inherent in and encompassed by the invention, together with many of the purposes and uses thereof, will become readily apparent from a reading of the ensuing description in conjunction with the annexed drawings.

In the drawings wherein a preferred form of the invention is shown by way of example:

Figure 1:
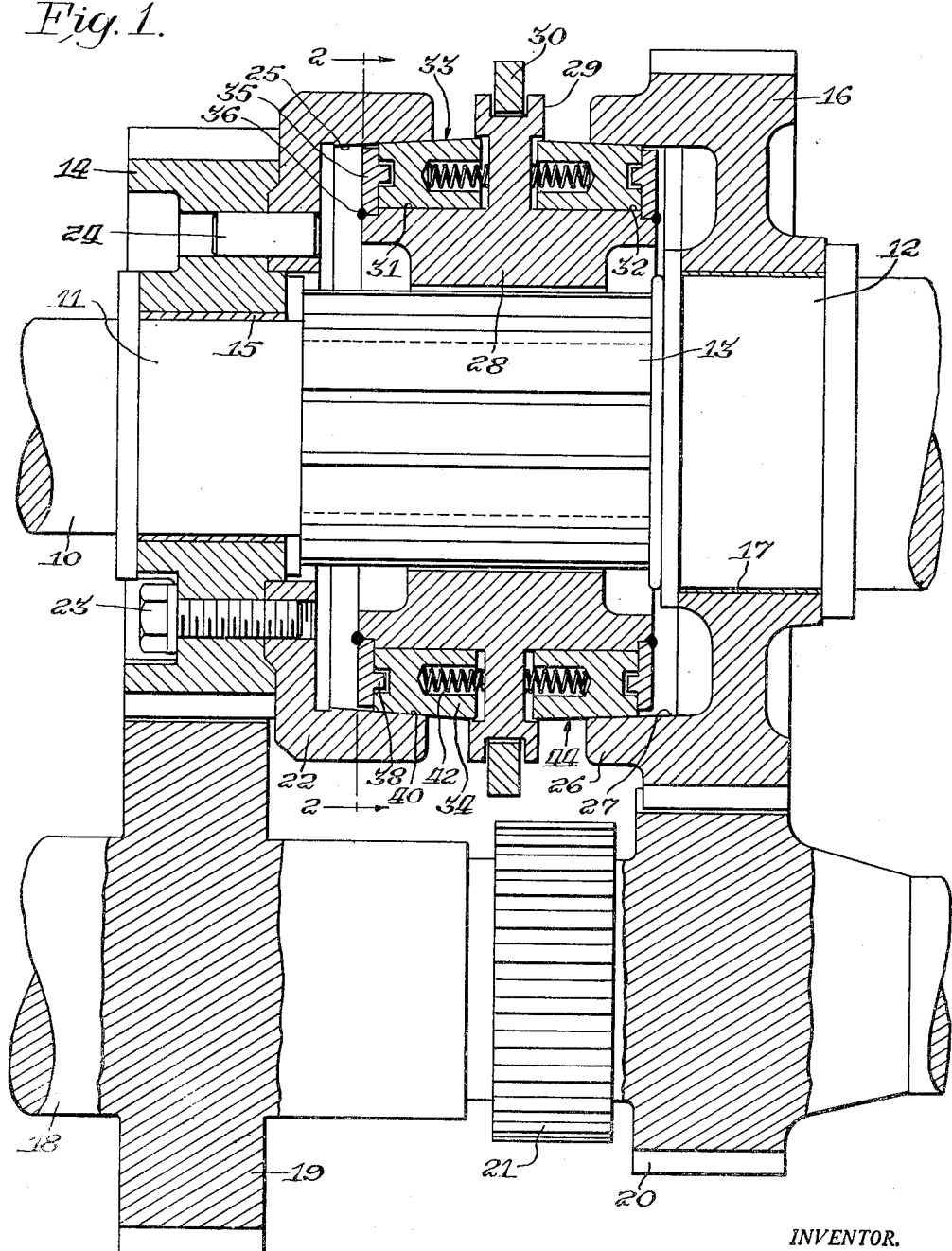
Figure 1 is a longitudinal sectional view of a portion of a transmission including the components with which the invention may be associated.
Figure 2:
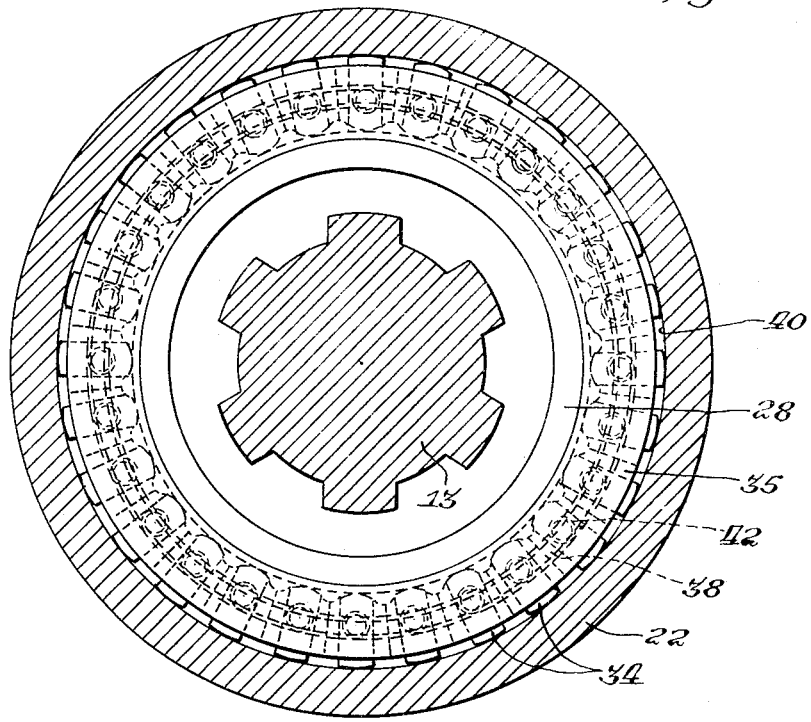
Figure 2 is a sectional view taken substantially on the line 2—2 of Figure 1.
Figure 6:
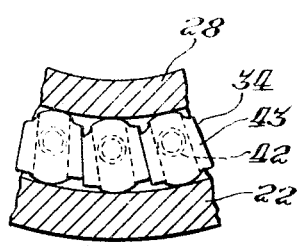
Figure 6 is a fragmentary sectional view showing the coupling elements and a portion of the segmented ring in engaged position.

The portion of the change-speed transmission shown here for the purposes of illustration and description may include an input or driving shaft 10 including a pair of coaxially spaced cylindrical bearing portions 11 and 12 intermediate which the shaft is provided with a splined portion 13. A first gear 14 is rotatably carried on the bearing portion 11 of the shaft 10 by means of a plain bearing 15. A second gear 16 is rotatably carried on the bearing portion 12 of the shaft 10 by means of a plain bearing 17.

A second or driven shaft 18 parallels the shaft 10 and preferably has formed integrally therewith a first gear 19 and a second gear 20. The gear 19 is in constant mesh with the gear 14 and the gear 20 is in constant mesh with the gear 16. This arrangement is generally conventional and provides for the driving of the shaft 18 by the shaft 10 in either of two ratios, depending upon whether the drive is established through the gears 14 and 19 or through the gears 16 and 20. The shaft 18 carries between the gears 19 and 20 a reverse gear 21, which may be disregarded for the present purposes.

The effectiveness of the drive between the shaft 10 and the shaft 18 depends upon a coupling engageable between the shaft 10 and either of the gears 14 or 16, varying speed ratios being established because of the different sizes of the gears 14, 16, 19 and 20. It is with the means for connecting the gears 14 and 16 to the shaft 10 that the present invention is primarily concerned.

The gear 14 is provided with an annular coupling element 22 which here takes the form of a cup-shaped member secured to the gear 14 for rotation therewith by means of a plurality of capscrews 23 and dowels 24. The coupling element 22 is provided with an interior clutching surface 25 which is preferably formed as the section of a cone. The other gear 16 is provided with a coupling element 26 also having an interior coupling surface 27 preferably formed as the section of a cone. In this instance the coupling element 26 and the gear 16 are formed as an integral unit.

Figure 4:
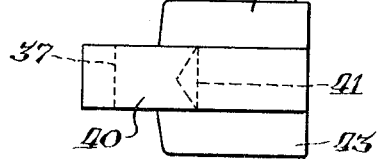
Figures 3, 4 and 5 are respectively end, top and side views of a segment or wedge by itself.
Figure 5:
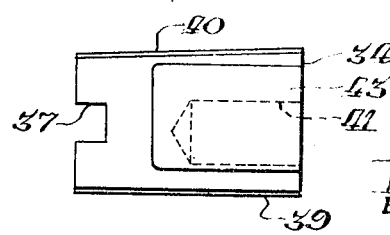

The shaft 10 has splined thereto by means of the splined portion 13 an internally splined coupling hub 28. The hub includes an integral annular radial flange 29 provided with an annular groove which may receive a shifting fork 30 by means of which the hub 28 may be shifted axially on the splined portion 13 of the shaft 10 in either direction toward or away from the gears 14 and 16. The hub 28 includes at each side of the central flange 29 a pair of annular surfaces 31 and 32. The surface 31 is so arranged with respect to the interior surface 25 of the element 22 as to provide an annular space between the two and the other surface 32 of the hub 28 and the interior surface 27 of the element 26 provide a similar annular space. A segmented ring indicated generally by the numeral 33 encircles the annular surface 31 and is encircled by the interior surface 25 of the coupling element 22. The ring 33 is made up of a plurality of segments or wedges 34 (Figures 3, 4 and 5) and these wedges are held in place by a ring 35 secured as by welding 36 to the left-hand (as viewed in Figure 1) end of the hub 28. Each wedge is grooved transversely at 37, the grooves in the wedges being alined in a circle about the axis in the shaft 10 and receiving a circular tongue 38 preferably formed integrally with the retaining ring 35.

Figure 3:
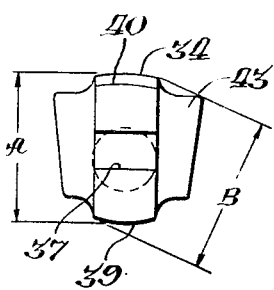

Each segment includes an inner surface 39 which is preferably arcuate as viewed from the end (Figure 3). The segment further includes an outer surface 40 which is inclined from front to rear to correspond with the inclination established by the conical interior surface 25 of the element 22. The segments are arranged to form the segmented ring and are disposed about the hub 28 in such manner that the inner surfaces 39 thereof ride on the outer annular surface 31 of the hub and so that the outer surfaces 40 thereof may cooperate with the interior surface 25 of the element 22. The ring 33 is permitted to have limited axial movement with respect to the hub 28 and for this purpose each segment 34 is drilled at 41 to receive a light compression spring 42 which acts against the proximate side of the flange 29 on the hub.

As best shown in Figure 3, each segment is constructed so that the mean distance straight across the segment between the inner and outer surfaces 39 and 40 is not greater than the mean distance radius-wise between the surface 31 of the hub 28 and the surface 25 of the element 22. This distance is indicated generally by the dimension A. On the other hand, the distance diagonally across the segment from one corner of the surface 39 to the opposite corner of the surface 40 is greater than the distance radius-wise between the surfaces 25 and 31. This dimension is indicated at B in Figure 3. The purpose of this construction is to permit the segments 34 normally to ride freely between the hub 28 and the coupling element 22. However, when the hub 28 is shifted to the left or toward the coupling element 22, the segments 34 are wedged between the surfaces 25 and 31 and the relative rotation between the hub 28 and coupling 22 causes the segments 34 to tilt or cock in the direction of rotation. This action results in a tight wedging of the segments between the surfaces 31 and 25. Each segment is provided at opposite sides with a pair of wing portions 43, the outer surfaces of which are disposed respectively on radii extended from the axis of the shaft 10. Because of variations incident to manufacture certain segments may engage before others. However, tilting or cocking of one segment will, because of the interengagement between the portions 43 of neighboring segments cause successive segments to tilt or cock and establish engagement between the parts 22 and 28. The compression springs 42, being individually operative with respect to the segments 34, will serve to equalize the positions of the segments so that a relatively constant engagement is guaranteed.

The hub 28 carries at its other side a segmented ring 44 identical to the segmented ring 33. The function and construction of the components of the ring 44 are exactly the same as those of the ring 33 and will not be described except in conjunction with the operation thereof for establishing driving relationship between the hub 28 and gear 16 through the coupling element 26.

*Operation*

Power delivered to the transmission by the input shaft 10 may be, as hereinbefore stated, transmitted to the shaft 18 in either of two gear ratios. The lower gear ratio will be established through the gears 14 and 19. Assuming that the shaft 18 is at rest and that it is desired to connect this shaft to the shaft 10, the hub 28 will be shifted to the left. Inasmuch as the shaft 10 is rotating and the hub is splined thereto, the hub will likewise be rotating. Initial shifting of the hub 28 to the left will effect a slight frictional engagement between the coupling element 22 and hub via the surfaces 25 and 31 and the segmented ring 33. This frictional engagement will result in tilting or cocking of the segments of the ring until the segments are positively wedged between the surfaces 25 and 31, whereupon the gear 14 will be coupled to the shaft 10 for rotation therewith and will, of course, drive the shaft 18 through the gear 19.

Assuming that the vehicle is now being driven by means of the gear ratio established through the gears 14 and 19, it will be noted that the gear 20 will be driving the gear 16. The latter is, however, freely rotatable on the shaft 18 and will not interfere with the operation of the transmission. Now, it may be desired to operate the transmission in the ratio permitted by the gears 16 and 20. On this occasion the engine clutch (not shown), connecting the shaft 10 to the source of power will be disengaged. This will cause the shaft 10 to decelerate. The shaft 18 will still be connected to the vehicle wheels and will continue to rotate. It follows that the gear 16 will then rotate at a higher speed than that of the shaft 10. The deceleration of the shaft 10 brings about, of course, deceleration of the hub 28.

The ordinary transmission coupling of the shaft 10 to the gear 16 would be accomplished by a gear clutch and, because of the different speeds of rotation between the shaft and the gear, considerable clashing of gear teeth would follow from the attempted engagement, unless some form of synchronizing means were utilized between the shaft and gear. Such synchronizing means are, of course, old and well known and the disadvantages thereof have been pointed out before. In the present instance there are no gear teeth to be meshed. Shifting of the hub 28 toward the gear 16 effects engagement between the hub and gear by means of the coupling surfaces 32 and 27 via the segmented ring 44. Initial shifting of the hub 28 effects a light frictional engagement between the ring 44 and the surfaces 32 and 27, causing the gear 16 to pick up the shaft 10 and bring it to synchronous rotation. Further shifting of the hub 28 to the right increases the wedging action between the surfaces 32 and 27 and the ring 44 and thus effects tilting or cocking of the segments of the ring 44 for the purpose of accomplishing final engagement between the parts.

One of the features of the invention is that the rings 33 and 44 may rotate at times with respect to the hub 28 and either of the coupling elements 22 and 26. This feature is important from the standpoint of eliminating engagement between the parts always at the same points. In other words, each time the segmented ring 33 is engaged between the surfaces 25 and 31 the outer and inner surfaces 39 and 40 of the segments 34 may engage the surfaces 31 and 25 at different points circumferentially of the latter surface. There is thus eliminated the possibility of cold-working or "Brinelling" the surfaces 31 and 25. The same result follows from the relationship between the segmented ring 44 and the surfaces 27 and 32. Since the wedges are symmetrical, the unit may operate in either direction of rotation.

The embodiment of the invention chosen for the purposes of illustration and description herein is that preferred as the result of selective tests based upon requirements for achieving the objects of the invention and developing the utility thereof in the most desirable manner, due regard being had to existing factors of economy, simplicity of design and construction, production methods and the improvements sought to be effected. It will be appreciated, therefore, that the particular structural and functional aspects emphasized here are not intended to exclude, but rather to suggest, such other adaptations and modifications of the invention as fall within the spirit and scope of the invention as defined in the appended claims.

What is claimed is:

1. A drive coupling assembly comprising: a first rotatable member including a hub having an outer annular surface; a concentrically arranged second member journaled with respect to the first member and having a portion provided with an annular inner surface encircling the outer annular surface of the hub in annularly spaced relation thereto; at least one of said surfaces tapering as the section of a cone about the axis of the members and said members being relatively axially shiftable between engaging and disengaging positions; means carried by one of the members for coupling the members together including a plurality of wedge elements, each having an inner face and an outer face and opposite sides, each side defining a straight line and lying on a radius from the axis of the assembly and the elements being arranged with a side of each element abutting in substantially full surface contact the proximate side of its neighboring element and lying in a circle about said axis to form a segmented ring loosely encircling the hub of the first member and loosely encircled by the inner surface of the second member, one of the faces of each of said elements being tapered according to the aforesaid tapering member surface so that the segmented ring may be frictionally engaged between the member surfaces when the members are shifted relatively axially to engaging position, said elements having a mean dimension radius-wise of the assembly less than, and a mean diagonal dimension greater than, the mean radial dimension between the inner and outer surfaces of the members so that said elements may, after the aforesaid frictional engagement, cock and wedge between the members to provide a driving connection between the members for rotation together.

2. A drive coupling assembly according to claim 1, with the further provision that: the member that carries the segmented ring includes a pair of annular radial wall portions loosely confining the ring axially therebetween.

3. A drive coupling assembly according to claim 2, in which: one radial wall and the segmented ring are associated for relative rotation by means of an annular tongue and groove arrangement.

4. A drive coupling assembly comprising: a first rotatable member including a hub having an outer annular surface and a pair of annular radial wall portions; a concentrically arranged second member journaled with respect to the first member and having a portion provided with an annular surface encircling the outer annular surface of the hub in annularly spaced relation thereto; at least one of said surfaces tapering as the section of a cone about the axis of the members and said members being relatively axially shiftable between engaging and disengaging positions; means carried by one of the members for coupling the members together including a plurality of wedged elements, each having an inner face and an outer face and opposite sides, each side defining a straight line and lying on a radius from the axis of the assembly and the elements being arranged with a side of each element abutting in substantially full surface contact the proximate side of its neighboring element and lying in a circle about said axis to form a segmented ring loosely encircling the hub of the first member and loosely encircled by the inner surface of the second member and loosely confined axially between the annular radial wall portions of said first rotatable member; spring means disposed between the ring and one of the said radial walls for urging the ring toward the other wall including a plurality of separate spring devices individually engageable with at least certain of the wedge elements, one of the faces of each of said elements being tapered according to the aforesaid tapering member surface so that the segmented ring may be frictionally engaged between the member surfaces when the members are shifted relatively axially to engaging position; said wedge elements having a mean dimension radius-wise of the assembly less than, and a mean diagonal dimension greater than, the mean radial dimension between the inner and outer surfaces of said first and second members so that said elements may, after the aforesaid frictional engagement, cock and wedge between said members to provide a driving connection between the members for rotation together.

5. A drive coupling assembly comprising: a first rotatable member including a hub having an outer annular surface; a concentrically arranged second member journaled with respect to the first member and having a portion provided with an annular inner surface encircling the outer annular surface of the hub in annularly spaced relation thereto; at least one of said surfaces tapering as the section of a cone about the axis of the members and said members being relatively axially shiftable between engaging and disengaging positions; means carried by one of the members for coupling the members together including a plurality of wedge elements, each having an inner face and an outer face and opposite sides, each side defining a straight line lying on a radius from the axis of the assembly and the elements being arranged with a side of each element abutting in substantially full surface contact the proximate side of its neighboring element and lying in a circle about said axis to form a segmented ring loosely encircling the hub of the first member and loosely encircled by the inner surface of the second member, one of the faces of each of said elements being tapered according to the aforesaid tapering member surface so that the segmented ring may be frictionally engaged between the member surfaces when the members are shifted relatively axially to engaging position, said elements having a mean dimension radius-wise of the assembly less than, and a mean diagonal dimension greater than, the mean radial dimension between the inner and outer surfaces of the members so that said elements may, after the aforesaid frictional engagement, cock and wedge between the members to provide a driving connection between the members for rotation together; spring means disposed between the segmented ring and one of the members for urging said ring axially toward engagement with the other member; and means provided on one of the members and cooperable with the segmented ring for limiting axial movement of said ring by said spring means.

6. A drive coupling assembly according to claim 5, with the further provision that: the spring means includes spring devices individually engageable with at least certain of the wedge elements.

7. A drive coupling assembly according to claim 6, in which: certain of the wedge elements are recessed to receive the spring devices, said spring devices being in the form of means including coiled springs.

FRANK W. AVILA.

REFERENCES CITED

The following references are of record in the file of this patent:

UNITED STATES PATENTS

| Number | Name | Date |
| --- | --- | --- |
| 1,065,635 | Sweet | June 24, 1913 |
| 1,542,040 | De Lavand | June 16, 1925 |
| 1,694,377 | De Lavand | Dec. 11, 1928 |
| 2,299,373 | Bergstrom | Oct. 20, 1942 |
| 2,342,227 | Swenson | Feb. 22, 1944 |
| 2,388,424 | Lund | Nov. 6, 1945 |
| 2,392,762 | Peterson et al. | Jan. 8, 1946 |

FOREIGN PATENTS

| Number | Country | Date |
| --- | --- | --- |
| 637,610 | France | May 4, 1928 |